(12) United States Patent
Reichert

(10) Patent No.: US 8,038,293 B2
(45) Date of Patent: Oct. 18, 2011

(54) OPTICAL SYSTEM FOR ENHANCED VISION

(76) Inventor: Abraham Reichert, Modiin (IL)

( * ) Notice: Subject to any disclaimer, the term of this patent is extended or adjusted under 35 U.S.C. 154(b) by 19 days.

(21) Appl. No.: 11/772,316

(22) Filed: Jul. 2, 2007

(65) Prior Publication Data

US 2009/0009882 A1    Jan. 8, 2009

(51) Int. Cl.
*G02C 5/00* (2006.01)
*G02C 1/00* (2006.01)
*G02C 7/02* (2006.01)
*G02C 7/04* (2006.01)
*A61F 9/02* (2006.01)

(52) U.S. Cl. ......... 351/159; 351/41; 351/43; 351/160 R; 2/430; 2/447

(58) Field of Classification Search ............... 351/41, 351/43, 668, 159–176; 359/668, 718; 2/447, 2/430
See application file for complete search history.

(56) References Cited

U.S. PATENT DOCUMENTS

| | | | |
|---|---|---|---|
| 4,824,225 A * | 4/1989 | Nishioka | 359/718 |
| 5,420,649 A * | 5/1995 | Lewis | 351/43 |
| 5,604,547 A * | 2/1997 | Davis et al. | 351/44 |
| 5,825,455 A * | 10/1998 | Fecteau et al. | 351/159 |
| 6,089,711 A * | 7/2000 | Blankenbecler et al. | 351/160 R |
| 6,158,859 A * | 12/2000 | Suiter | 351/43 |
| 7,025,460 B2 * | 4/2006 | Smitth et al. | 351/221 |
| 7,156,516 B2 * | 1/2007 | Morris et al. | 351/161 |
| 7,300,149 B2 * | 11/2007 | Hwang | 351/43 |
| 2006/0221298 A1 * | 10/2006 | Matsumoto et al. | 351/43 |

OTHER PUBLICATIONS

Ditchburn, R. W. Light. Minneapolis: Dover Publications, Incorporated, 1991, pp. 152-153.*

* cited by examiner

*Primary Examiner* — Scott J Sugarman
*Assistant Examiner* — Zachary Wilkes
(74) *Attorney, Agent, or Firm* — Dekel Patent Ltd.; David Klein

(57) ABSTRACT

An optical system including a vision device wearable by a user for seeing objects in a field of view (FOV), the vision device comprising a front section with a normal distortion of rays passing therethrough, and an anamorphic optical element extending from the front section that distorts rays passing therethrough with an extended distortion greater than that of the front section and which enlarges the FOV.

20 Claims, 13 Drawing Sheets

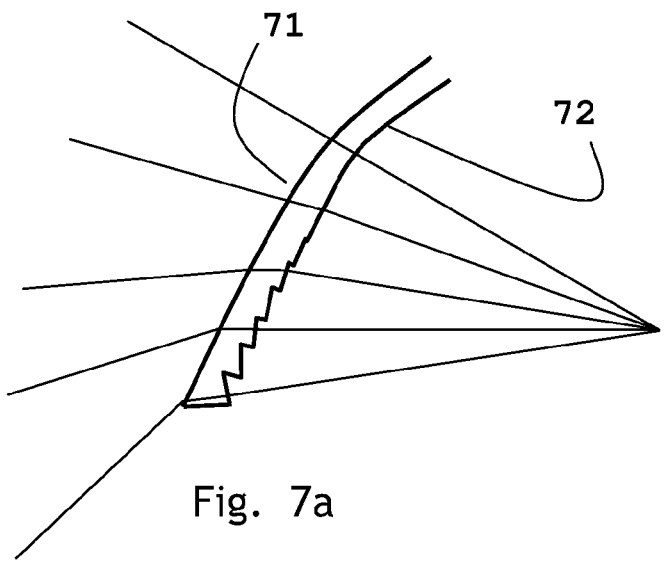
Fig. 7a
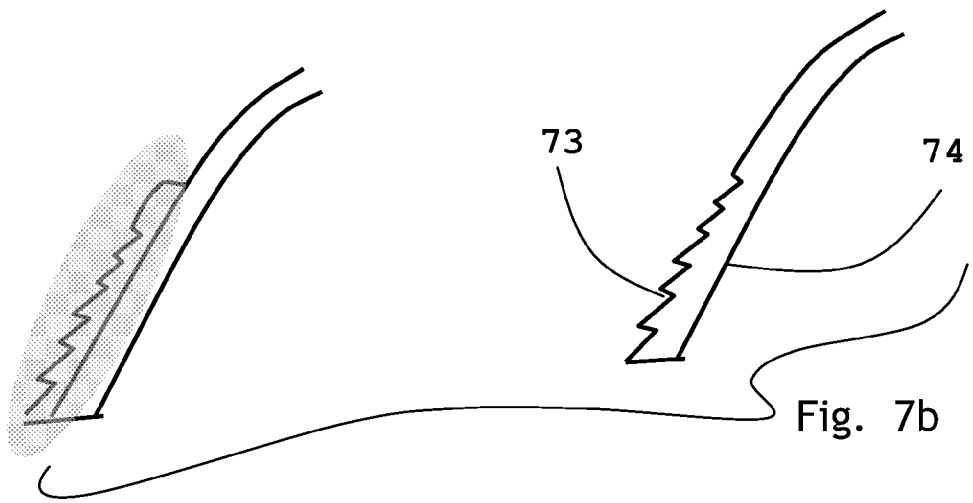
Fig. 7b
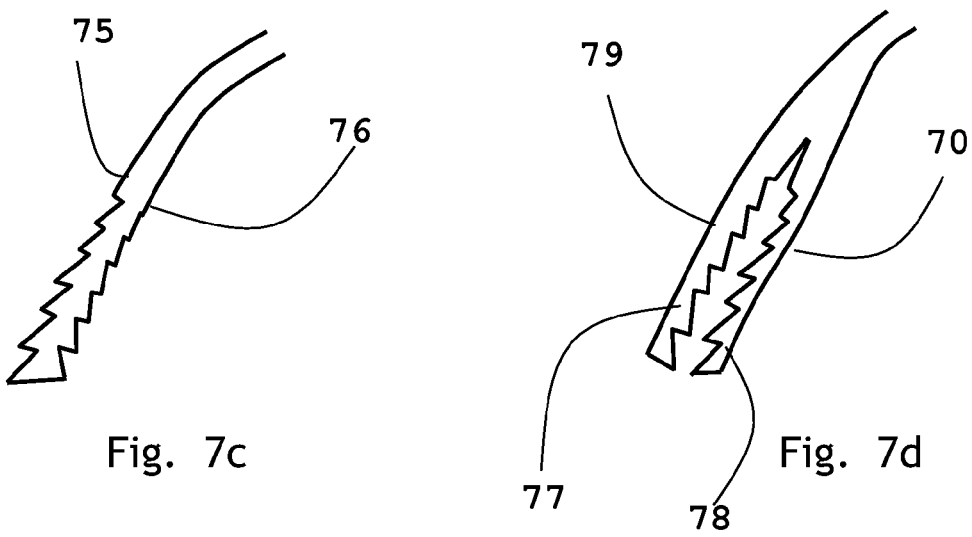
Fig. 7c
Fig. 7d

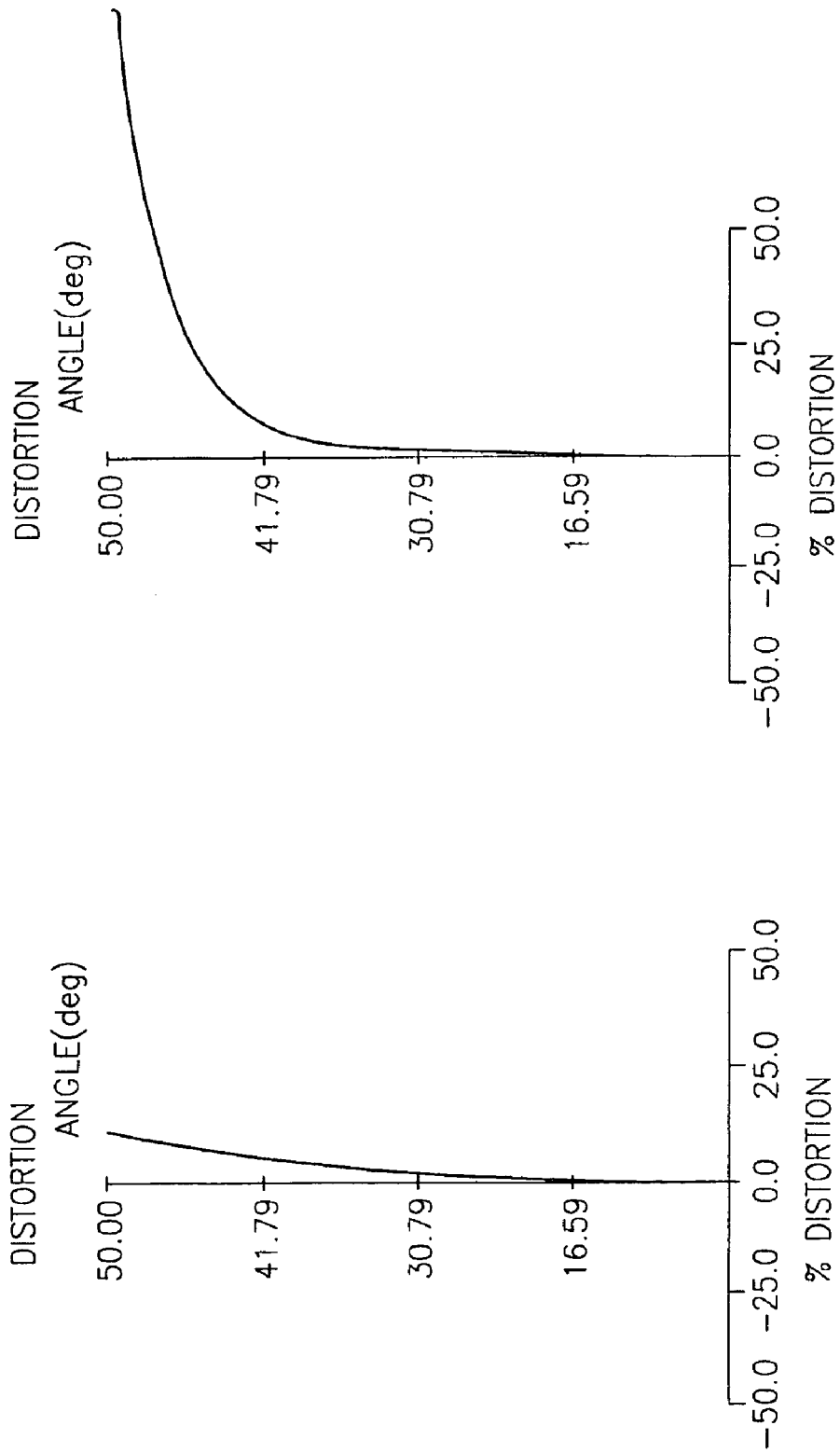

OPTICAL SYSTEM FOR ENHANCED VISION

FIELD OF THE INVENTION

The present invention relates generally to peripheral vision, and more specifically to methods and apparatus for increasing the human peripheral field of view.

BACKGROUND OF THE INVENTION

Enlarging peripheral vision is necessary for many applications, such as motorcycle or bicycle riders, divers, sport players, etc. Human vision has the ability to detect moving objects up to 100° off the direct view or 200° with both eyes, but is limited beyond this range. To overcome this limitation, devices such as side view mirrors are used, which have a small field of view (FOV) and enable seeing objects behind the back. In cars it is very simple to implement these mirrors, while in motorcycles and other vehicles it is more complicated. It is also known to place rear view mirrors in helmets and eyeglasses. Rear view mirrors have drawbacks. They obscure some of the forward FOV. The reflected FOV is very small. They tend to be cumbersome and hard to adjust.

SUMMARY OF THE INVENTION

The present invention seeks to provide an improved optical system for enlarging peripheral vision without all the above drawbacks of the prior art, as is described more in detail hereinbelow.

The optical system increases the human peripheral vision beyond 200° homogenously and without using any mirrors. One embodiment of the invention adds a graduated optical or prismatic power to a visor or glasses (e.g., eyeglasses, sunglasses, etc.) at the edge of the peripheral FOV, for example, higher than 70°. The optical power is negative so the normal 200° FOV can become much larger, increasing up to 240° or even more. Since the optical acuity of the human eye at the edge of the FOV is very low, there is no need for high image quality.

The optical power is in the form of an anamorphic optical element (also referred to as a distorting optical element), which is added to the edge of the FOV can be refractive or diffractive in nature. For example, the invention can be carried out with a segment of a diverging optical element, a segment of a diverging Fresnel element, a segment of a diffractive diverging optical element or a graduated grating or any combination thereof (as described with reference to FIGS. 5-7D below). The optical element of the invention can be added to a vision device worn by a user, such as but not limited to, helmets, visors, glasses or contact lenses, for example, for enlarging peripheral vision. (The terms "vision device" and "visor" will be used interchangeably as a general term throughout the specification and claims for any vision device worn by a user.) The advantages of the invention are numerous. For example, it enables motorcycle riders to see more than 200° without head turning, thereby eliminating accidents and reducing the danger of driving. It is very important to fighter aircraft pilots. In general, enlarged peripheral vision improves spatial orientation in space.

BRIEF DESCRIPTION OF THE DRAWINGS

The present invention will be understood and appreciated more fully from the following detailed description taken in conjunction with the drawings in which:

FIGS. 7A-7D illustrate different Fresnel anamorphic segments for enlarging the FOV, in accordance with an embodiment of the present invention.

FIG. 11C illustrates the distortion of this prior art lens.

FIG. 11E illustrates the extended distortion of the lens of FIG. 11D.

DETAILED DESCRIPTION OF EMBODIMENTS

Figure 1:
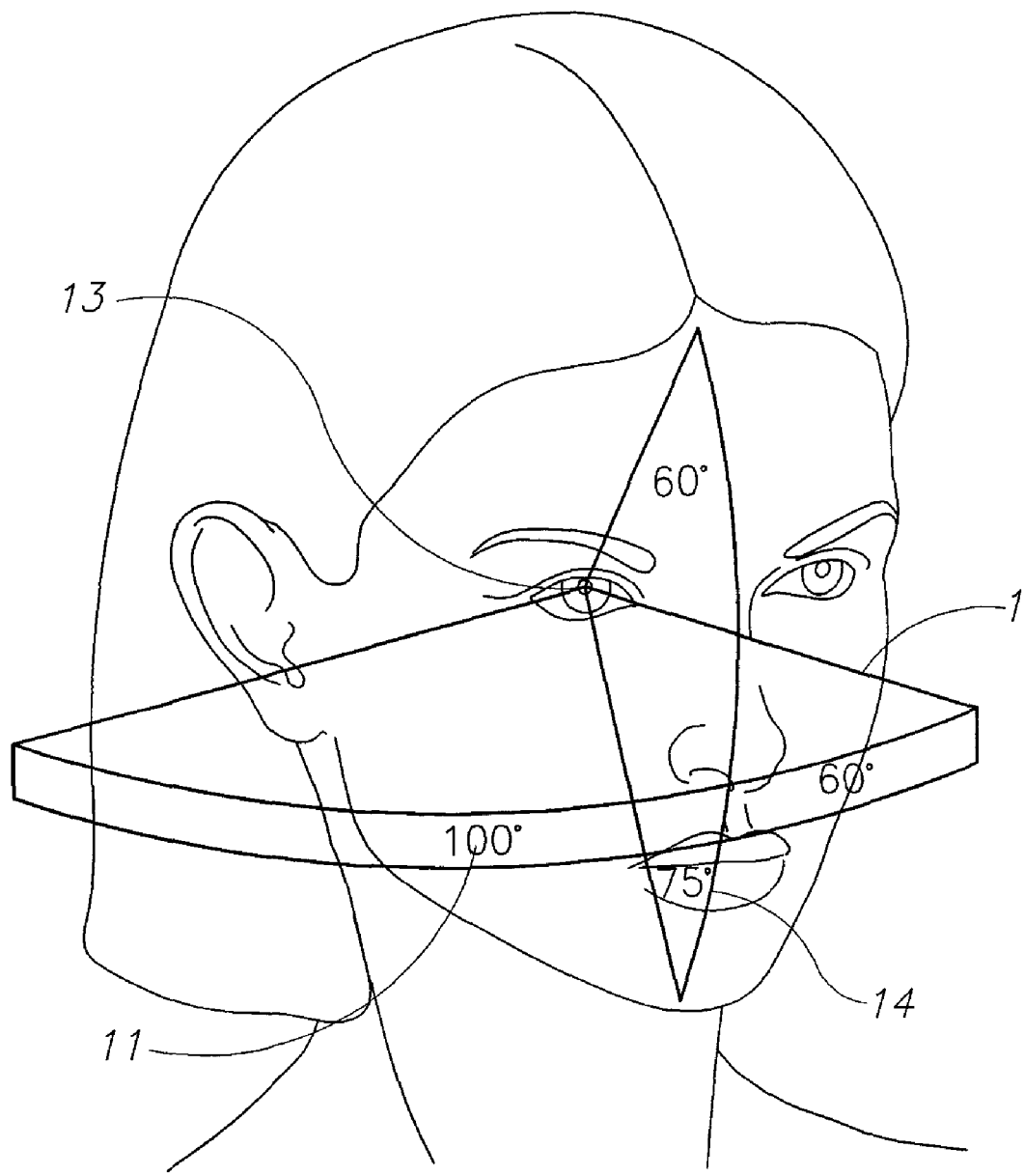
FIG. 1 is a general pictorial illustration of the human field of view.

Reference is now made to FIG. 1, which illustrates a Field of View (FOV) of a human eye. The vertical upper maximum FOV (13) is about 60°, and the lower FOV (14) is about 70°. The horizontal FOV to the right (11) is about 100° and the FOV to the left (12) is about 60°.

Figure 2:
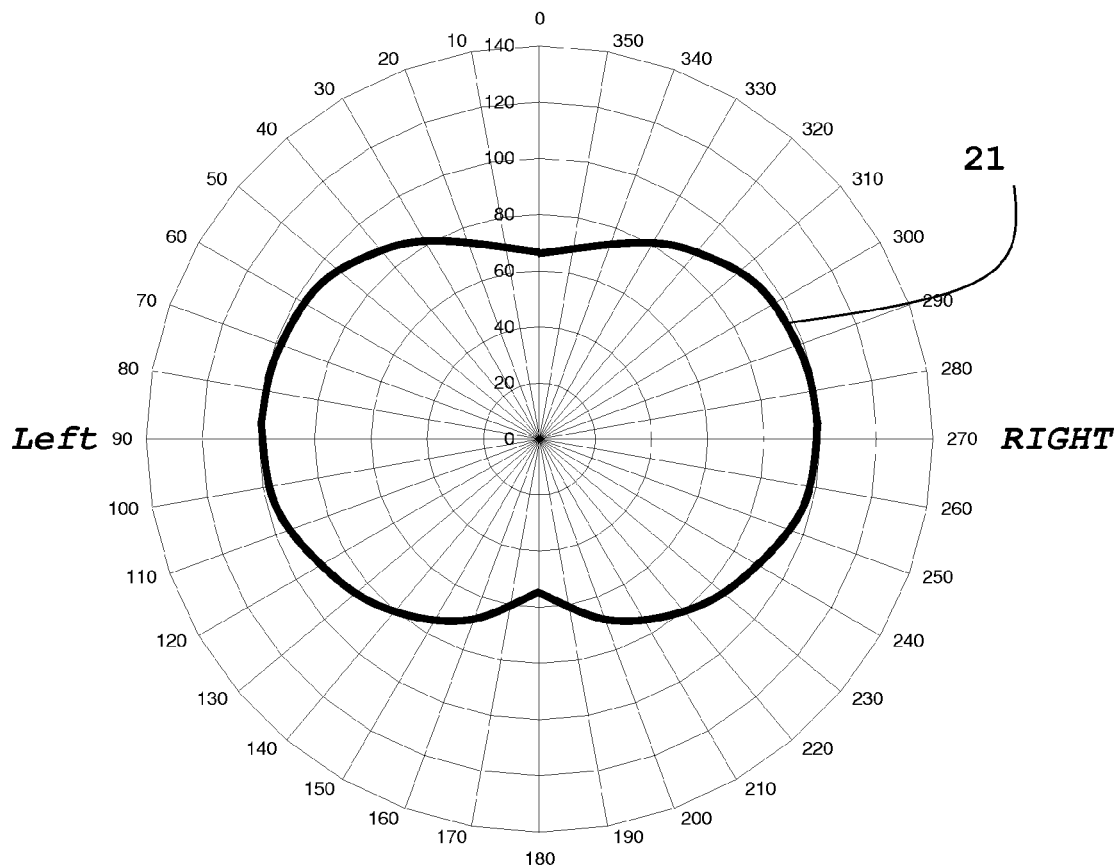
FIG. 2 is a polar diagram of the human field of view.
Figure 3:
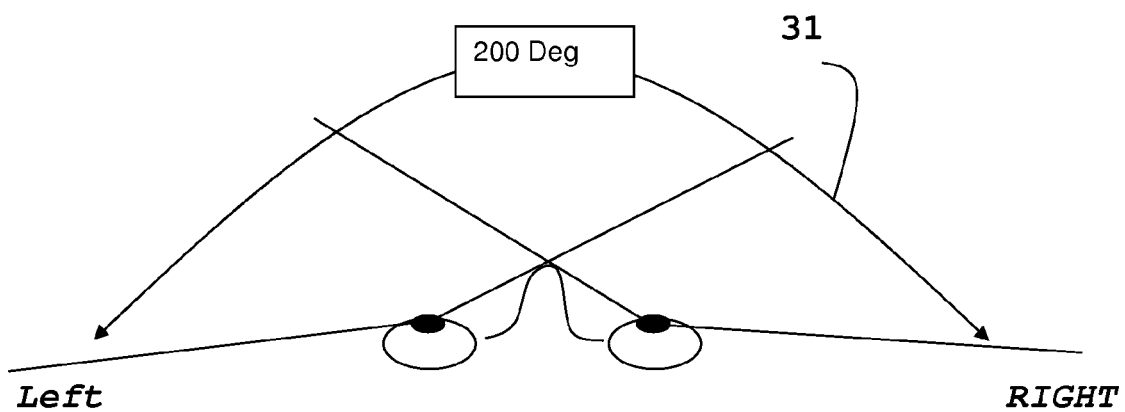
FIG. 3 illustrates the horizontal field of view.

Reference is now made to FIG. 2, which is a schematic polar diagram showing the total FOV of both eyes. The horizontal total FOV is about 200°. FIG. 3 illustrates the FOV in the horizontal plane of both eyes.

Figure 4:
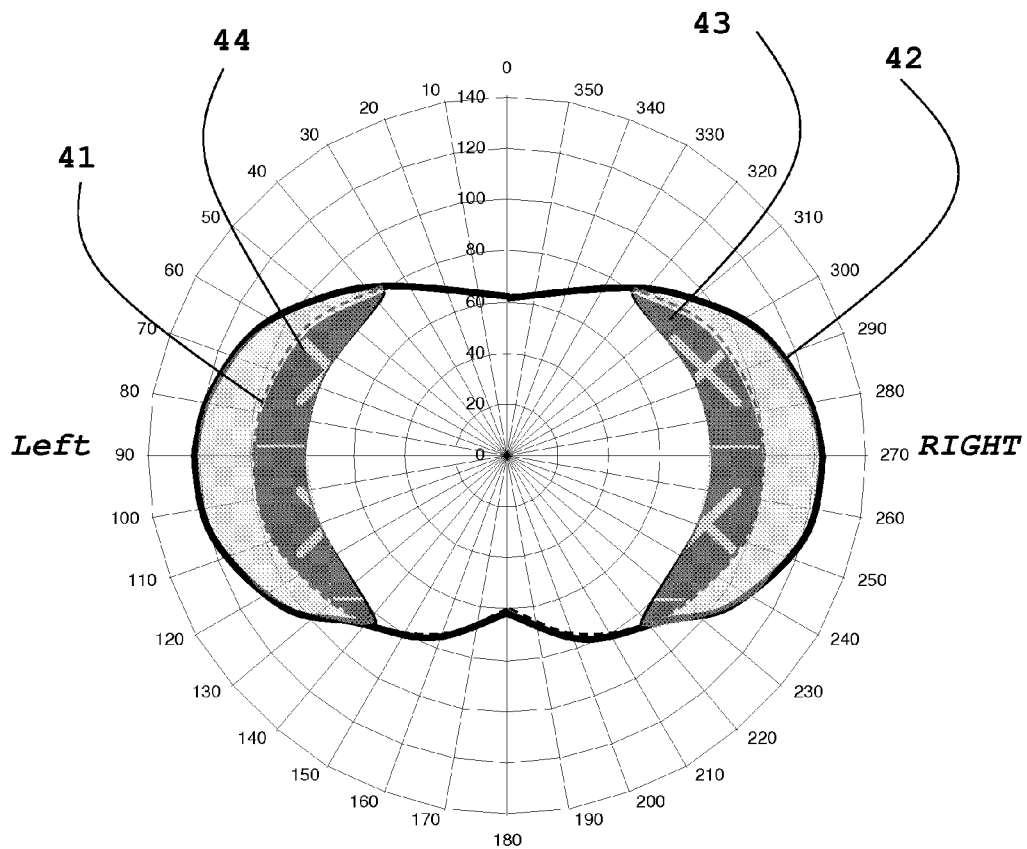
FIG. 4 is a polar diagram of the extended field of view.

The present invention provides structure for stretching the total FOV, such as in the horizontal space. FIG. 4 illustrates a polar diagram of the normal FOV (41) and the stretched FOV (42), which has been stretched with an anamorphic segment constructed in accordance with the present invention (described below). FIG. 4 illustrates the area of the anamorphic segment at the right zone (43) and at the left zone (44).

Figure 5A:
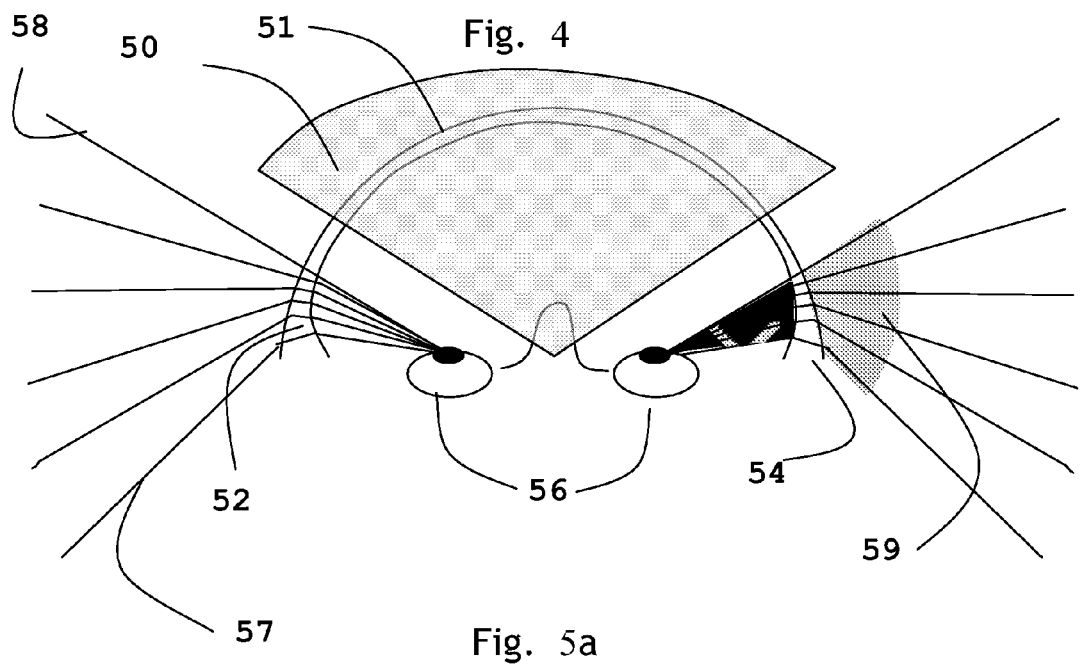
FIGS. 5A-5B are schematic representations of a visor with an anamorphic segment for enlarging the FOV, constructed and operative in accordance with embodiments of the present invention.

Reference is now made to FIG. 5A, which illustrates anamorphic segments (52, 54) as a part of a visor (51) for enlarging basically the horizontal FOV (but also the vertical FOV), constructed and operative in accordance with an embodiment of the present invention. The visor (51) is divided into three sections, a front section (50), a left anamorphic segment (AS) (52) and a right AS (54). Rays passing through the front section (50) toward the user eyes (56) have minimal refraction due to the low power of the visor front section. In contrast, the rays at an edge of the peripheral FOV (59) passing through the right and left AS bend as function of incident location across the AS. For instance, rays (57) at the edge of the AS have the largest deflection, while rays (58) nearer the front section (50) of the visor have the least deflection.

Figure 5B:
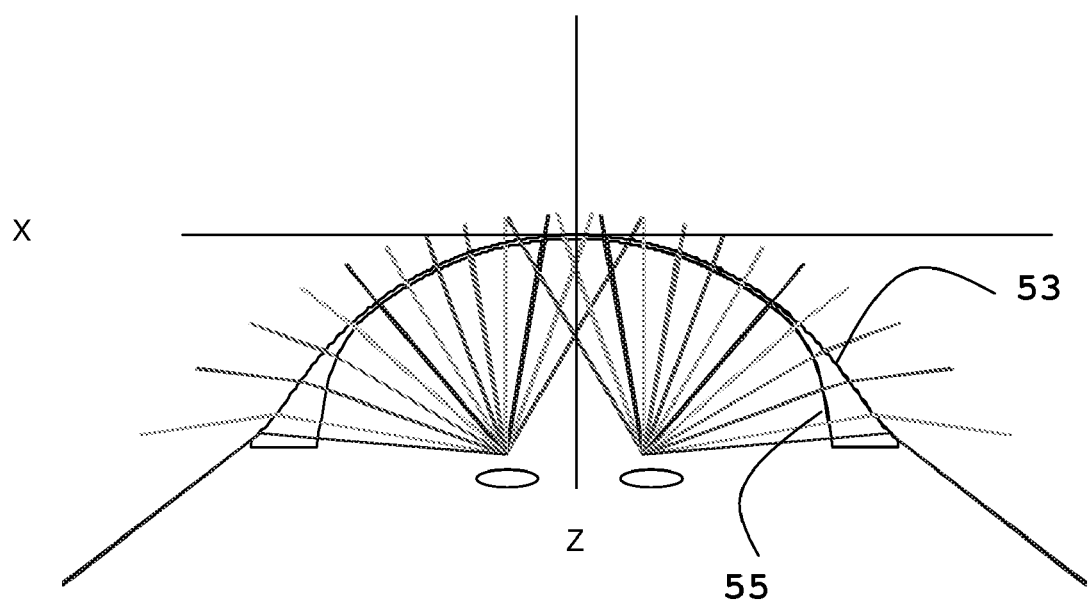

Reference is now made to FIG. 5B, which illustrates an example of such an anamorphic section as a part of a visor. The inner (55) and outer surfaces (53) have aspheric shape profiles with high order up to $X^{20}$ and basic radii of 150 and 152 mm respectively.

The following is an equation for a horizontal cross section (X direction) with high order of asphericity:

$$Z = \frac{cX^2}{1 + \sqrt{1 - (1-k)c^2 X^2}} + AX^4 + BX^6 + \ldots MX^n$$

wherein Z—Sag of the surface
X—Surface coordinate
c—Surface basic curvature
k—Conic coefficient
A-M—are the 4th, 6th, nth order deformation coefficients respectively.

This example has the following values:

|  | C | K | A(X$^4$) – E(X)$^{16}$ | G(X$^{18}$) | H(X$^{20}$) |
|---|---|---|---|---|---|
| Inner Surface | 1/150 | 0 | 0 | 0.14e$^{-35}$ | −0.2e$^{-39}$ |
| Outer Surface | 1/152 | 0 | 0 | 0.11e$^{-39}$ | 0.9e$^{-42}$ |

Figure 6A:
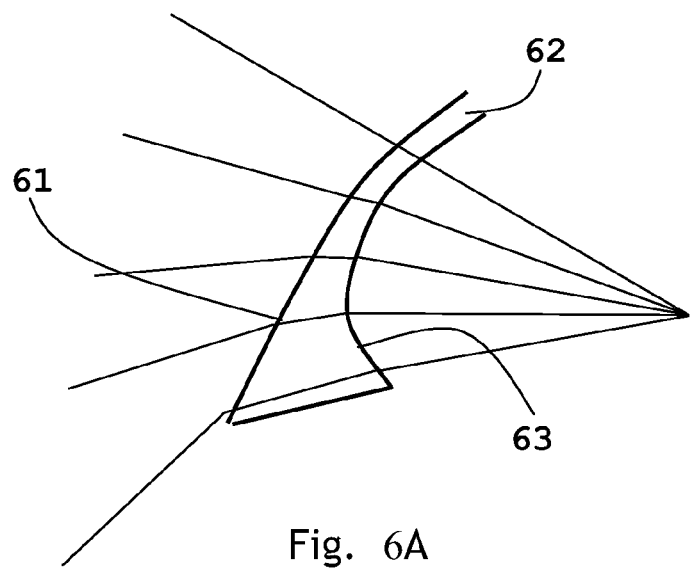
FIGS. 6A-6C illustrate different refractive anamorphic segments for enlarging the FOV, in accordance with an embodiment of the present invention.
Figures 6B, 6C:
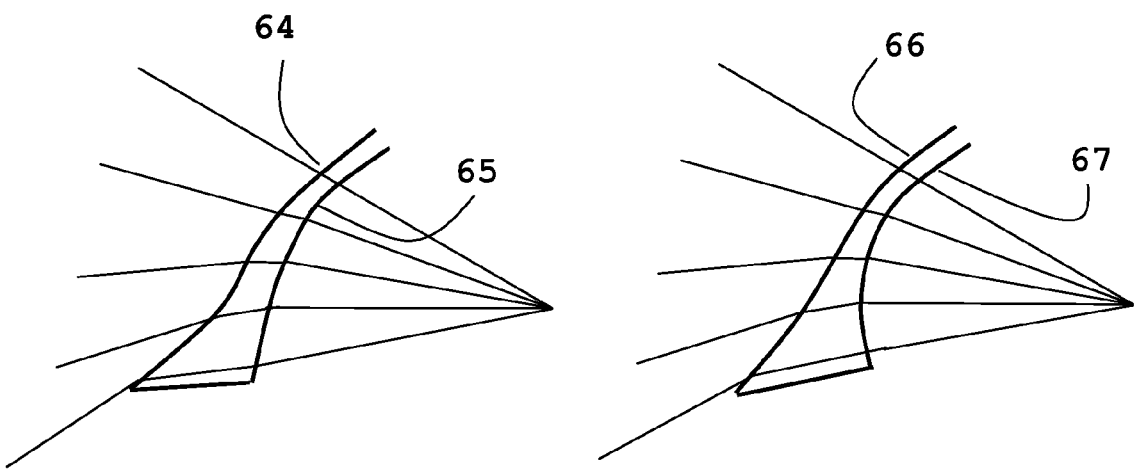

FIGS. 6A-6C illustrate different refractive anamorphic segments for enlarging the FOV, in accordance with an embodiment of the present invention. In FIG. 6A, an outer surface (61) of a visor (62) is smooth, while an inner surface (63) has an anamorphic shape. In FIG. 6B, an outer surface (64) has an anamorphic shape, while an inner surface (65) has a smooth shape. In FIG. 6C, both inner and outer surfaces (66, 67) have an anamorphic shape.

Another way to get the FOV enlarged is by changing the anamorphic segment to an anamorphic Fresnel section. FIGS. 7A-7D illustrate different Fresnel anamorphic segments for enlarging the FOV, in accordance with an embodiment of the present invention. FIG. 7A illustrates an embodiment with an anamorphic Fresnel section (71) in the inner surface (72). FIGS. 7B and 7B' illustrate an anamorphic Fresnel section (74) on the outer side (73) (in FIG. 7B it is attached to the visor, whereas in FIG. 7B' it is integrally formed with the visor). FIG. 7C illustrates an embodiment with an anamorphic Fresnel section on both sides (75, 76) of the visor. Another option, shown in FIG. 7D, is to split the visor into two sections (77, 78) at the edge of the FOV and to apply the Fresnel section to one or two inner sides (79, 70) of the split edges.

Figure 8A:
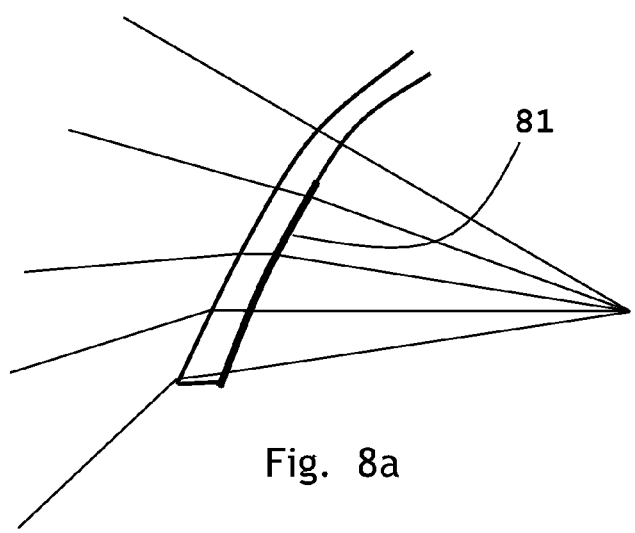
FIGS. 8A-8C illustrate different diffractive anamorphic segments for enlarging the FOV, in accordance with an embodiment of the present invention.
Figure 8B:
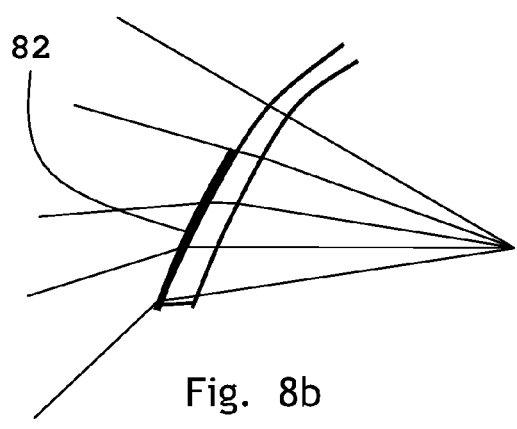
Figure 8C:
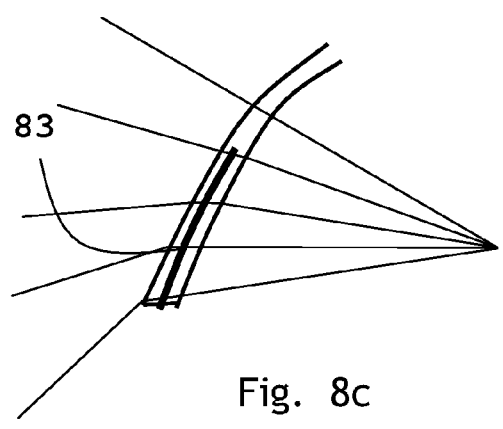

The abovementioned methods use refraction power as a way to deflect the light in an extended distortion manner. The following embodiments use diffraction optical elements (diffractive anamorphic segments) to deflect the light in an extended distortion manner and achieve the same results. FIGS. 8A-8C illustrate diffractive anamorphic segments on a visor. In FIG. 8A, one or more diffractive anamorphic segments (81) are on an inner surface of the visor. In FIG. 8B, one or more diffractive anamorphic segments (82) are on an outer surface of the visor. In FIG. 8C, one or more diffractive anamorphic segments (83) are between inner and outer surfaces of the visor.

The present invention has many applications, some of which are described with reference to the following drawings.

Figure 9:
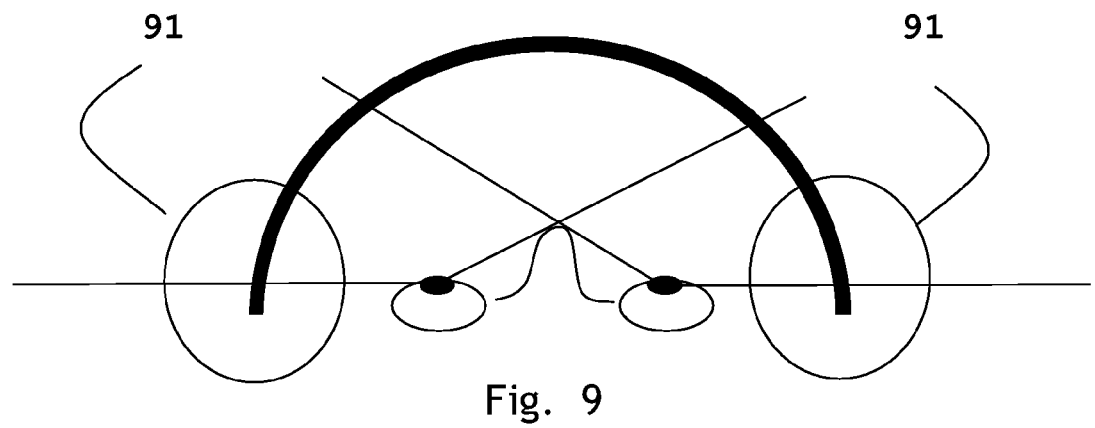
FIG. 9 illustrates implementation of the anamorphic segment in a visor, constructed and operative in accordance with an embodiment of the present invention.

FIG. 9 shows an implementation of an anamorphic segment to a visor. The visor itself allows the user to have a FOV of 200°, and the anamorphic segment can enlarge the FOV to about 240° and even higher.

Figure 10:
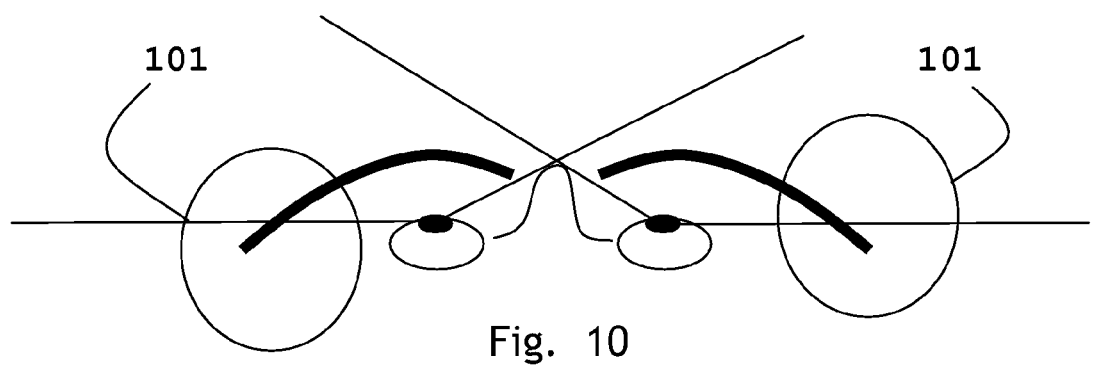
FIG. 10 illustrates implementation of the anamorphic segment in sunglasses, constructed and operative in accordance with an embodiment of the present invention.

FIG. 10 shows an implementation of an anamorphic segment to sunglasses. Typical sunglasses of the prior art have smaller FOV, around 160-170. In accordance with the present invention, by adding the AS, the FOV can be increased to 200° or even more.

Figure 11A:
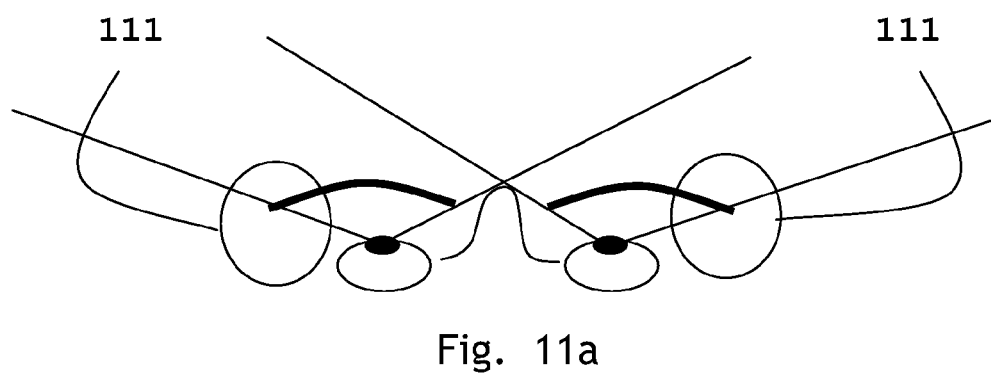
FIG. 11A illustrates implementation of the anamorphic segment in eyeglasses, constructed and operative in accordance with an embodiment of the present invention.

FIG. 11A shows an implementation of an anamorphic segment to eyeglasses. In this case, the FOV of the viewer is much smaller, around 120-160°. By adding the AS, the FOV can be enlarged to 160-180°.

Figure 11B:
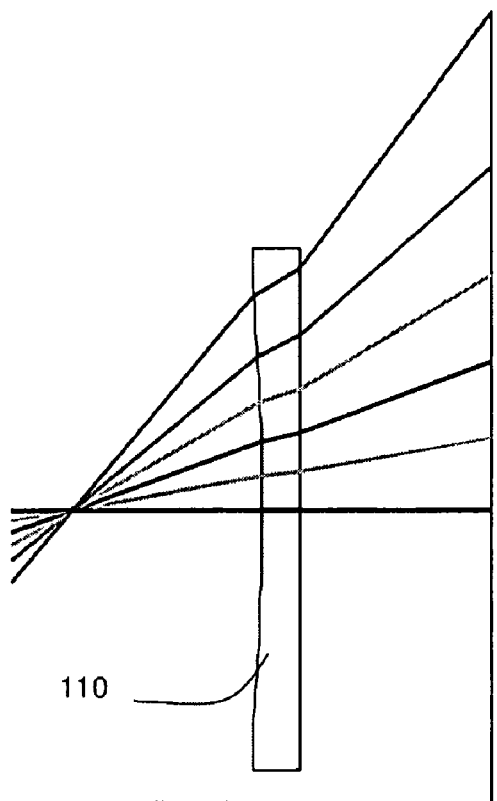
FIG. 11B illustrates a prior art −3 diopter lens.
Figure 11D:
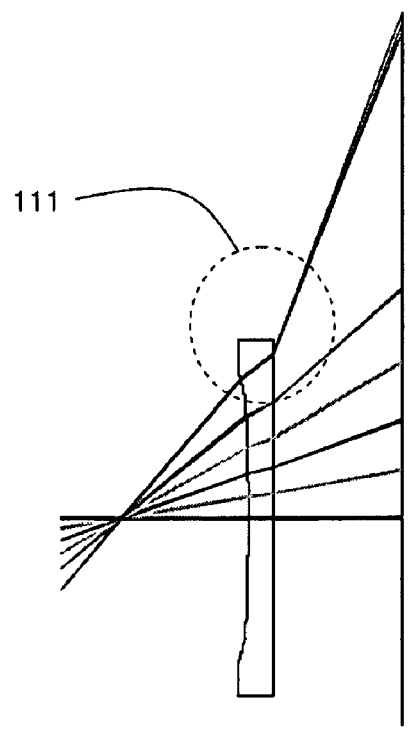
FIG. 11D illustrates a lens with an anamorphic segment in accordance with an embodiment of the present invention.

FIG. 11B shows a normal (prior art) −3 diopter lens (110) with its normal distortion as shown in FIG. 11C. By adding the anamorphic segment (111) to the edge of the lens as shown in FIG. 11D, an extended distortion is obtained as shown in FIG. 11E, which increases the FOV of the user.

Figure 12:
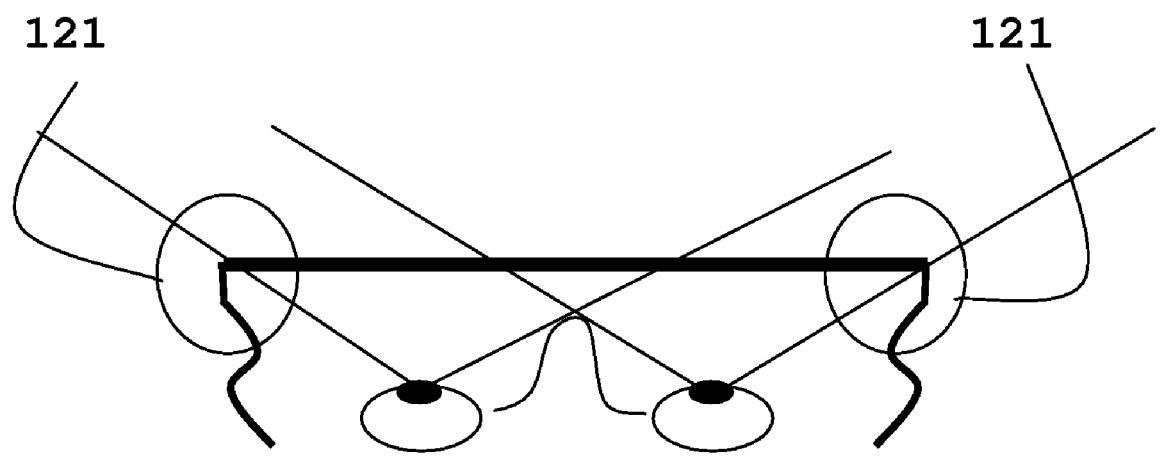
FIG. 12 illustrates implementation of the anamorphic segment in a diving mask, constructed and operative in accordance with an embodiment of the present invention.

FIG. 12 shows an implementation of an anamorphic segment to a diving mask.

Figure 13:
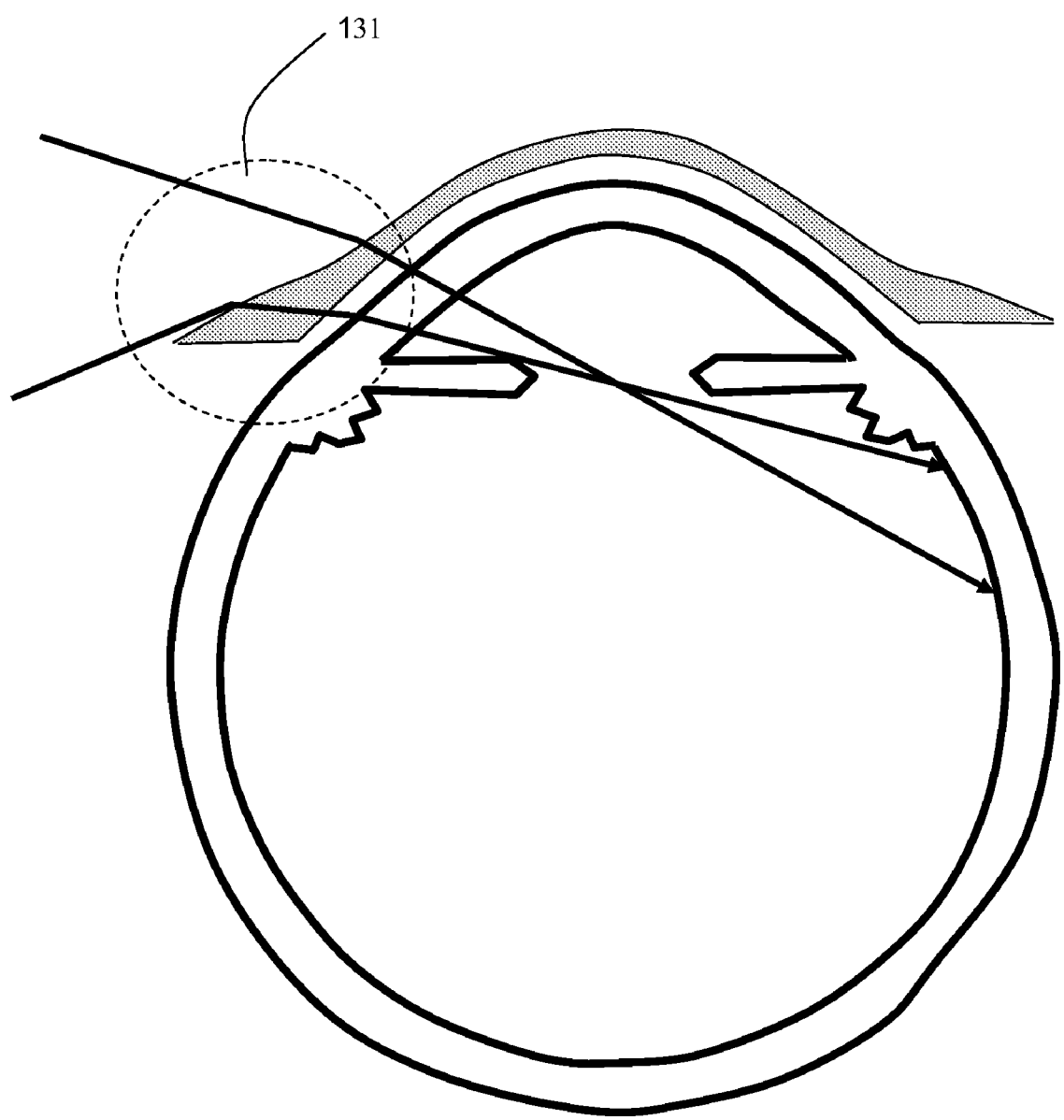
FIG. 13 illustrates implementation of the anamorphic segment in a contact lens, constructed and operative in accordance with an embodiment of the present invention.

FIG. 13 shows an implementation of an anamorphic segment (131) to a contact lens, which may increase the FOV to 240° and more.

Figure 14:
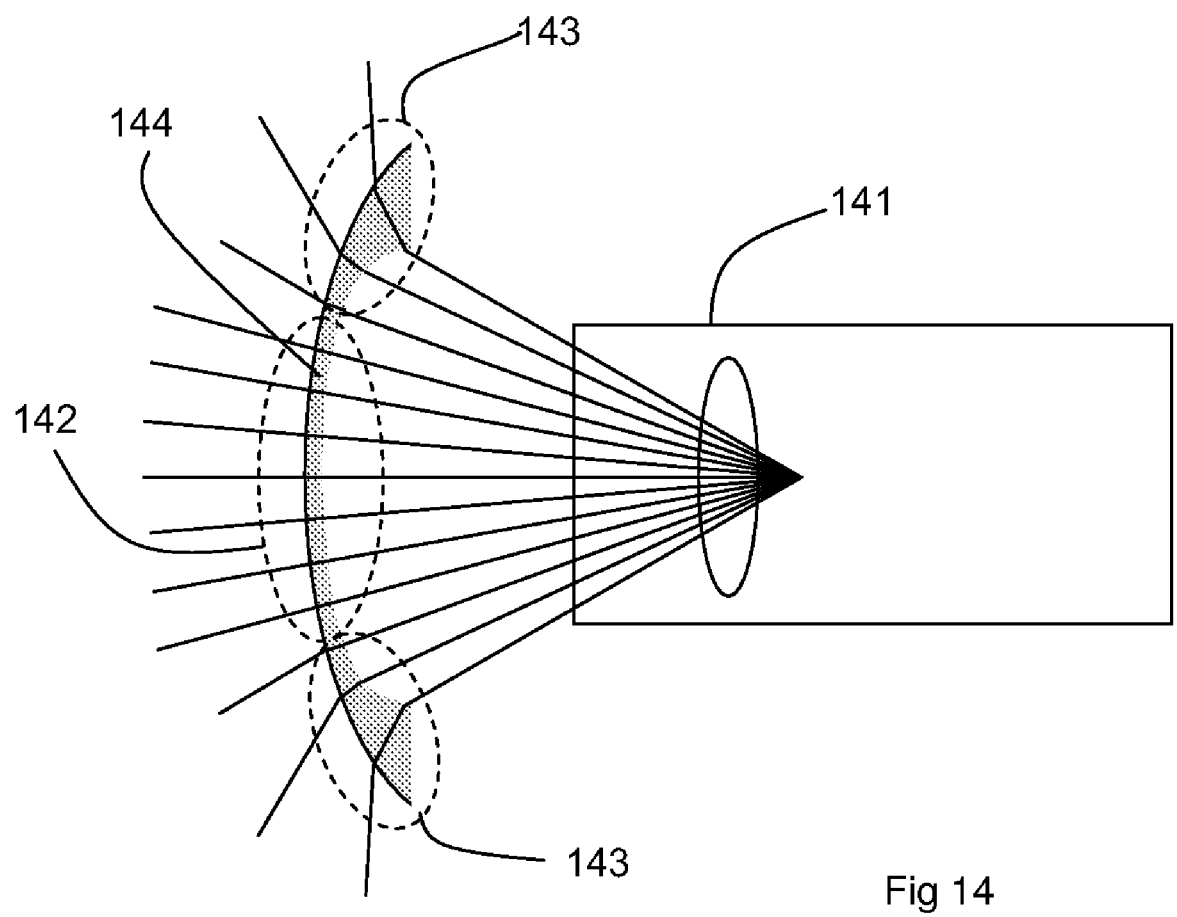
FIG. 14 is a schematic representation of an optical system with an anamorphic segment for enlarging the FOV, constructed and operative in accordance with an embodiment of the present invention.

Reference is now made to FIG. 14, which illustrates an optical system 141 for enlarging the FOV, constructed and operative in accordance with an embodiment of the present invention.

An optical device 144 is added to the optical system 141 for seeing objects in a field of view (FOV). The optical device 144 includes a front section 142 with a normal distortion of rays passing therethrough. One or more anamorphic optical elements 143 extend from the front section 142 that distorts rays passing therethrough with an extended distortion than the front section 142 and which enlarges the FOV, as described any of the for any of the embodiments of the invention hereinabove. As before, the anamorphic optical element 143 is positioned at an edge of the optical device 144. The anamorphic optical element 143 may be refractive or diffractive.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:
1. An optical system comprising:
a vision device wearable by a user for seeing objects in a field of view (FOV), said vision device comprising a curved front section that defines a viewing axis along which the user sees straight ahead; and
a curved anamorphic optical element having negative optical power and extending from a side edge of said front section that sideways distorts rays passing therethrough with an extended distortion greater than that of said front section and which enlarges said FOV, the extended distortion being at least 90° sideways with respect to said viewing axis, wherein said anamorphic optical element has a cross section profile of a high order aspheric shape, and wherein said cross section profile has an asphericity defined by:

$$Z = \frac{cX^2}{1 + \sqrt{1-(1-k)c^2X^2}} + AX^4 \ldots MX^n$$

wherein Z—Sag of the surface
X—Surface height
c—Surface basic curvature
k—Conic coefficient
A-M—are 4th, 6th, nth order deformation coefficients respectively.

2. The optical system according to claim 1, wherein said anamorphic optical element and said front section are a single, continuous one-piece optical element, and wherein the extended distortion is greater than 90° sideways.

3. The optical system according to claim 1, wherein said anamorphic optical element is refractive.

4. The optical system according to claim 1, wherein said anamorphic optical element is diffractive.

5. The optical system according to claim 1, wherein said vision device comprises sunglasses.

6. The optical system according to claim 1, wherein said vision device comprises eyeglasses.

7. The optical system according to claim 1, wherein said vision device comprises a diving mask.

8. The optical system according to claim 1, wherein said vision device comprises a contact lens.

9. The optical system according to claim 1, wherein said vision device comprises a visor.

10. The optical system according to claim 1, wherein said front section has a uniform thickness, and wherein one of inner and outer surfaces of said anamorphic optical element is anamorphic and the other of the inner and outer surfaces of said anamorphic optical element is smooth.

11. The optical system according to claim 1, wherein the sags Z of inner and outer surfaces of said anamorphic optical element are defined with parameters as follows:

|  | C | K | $A(X^4) - E(X)^{16}$ | $G(X^{18})$ | $H(X^{20})$ |
|---|---|---|---|---|---|
| Inner Surface | 1/150 | 0 | 0 | $0.14e^{-35}$ | $-0.2e^{-39}$ |
| Outer Surface | 1/152 | 0 | 0 | $0.11e^{-39}$ | $0.9e^{-42}$. |

12. An optical system comprising:
a vision device wearable by a user for seeing objects in a field of view (FOV), said vision device comprising a curved front section that defines a viewing axis along which the user sees straight ahead; and
a curved anamorphic optical element extending from a side edge of said front section that sideways distorts rays passing therethrough with an extended distortion greater than that of said front section and which enlarges said FOV, the extended distortion being at least 90° sideways with respect to said viewing axis, wherein said anamorphic optical element comprises a segment of a diverging Fresnel element having negative optical power.

13. The optical system according to claim 12, wherein said Fresnel element is placed on both inner and outer sides of said anamorphic optical element.

14. The optical system according to claim 12, wherein said Fresnel element is placed on two inner sides of said anamorphic optical element.

15. The optical system according to claim 12, wherein said anamorphic optical element and said front section are a single, continuous one-piece optical element, and wherein the extended distortion is greater than 90° sideways.

16. An optical system comprising:
an optical device added to an optical system for seeing objects in a field of view (FOV), said optical device comprising a curved front section that defines a viewing axis along which the object are seen straight ahead; and
a curved anamorphic optical element having negative optical power and extending from a side edge of said front section that sideways distorts rays passing therethrough with an extended distortion greater than that of said front section and which enlarges said FOV, the extended distortion being at least 90° sideways with respect to said viewing axis,
wherein said anamorphic optical element has a cross section profile of a high order aspheric shape, and wherein said cross section profile has an asphericity defined by:

$$Z = \frac{cX^2}{1 + \sqrt{1-(1-k)c^2X^2}} + AX^4 \ldots MX^n$$

wherein Z—Sag of the surface
X—Surface height
c—Surface basic curvature
k—Conic coefficient
A-M—are 4th, 6th, nth order deformation coefficients respectively.

17. The optical system according to claim 16, wherein said anamorphic optical element and said front section are a single, continuous one-piece optical element, and wherein the extended distortion is greater than 90° sideways.

18. The optical system according to claim 16, wherein said anamorphic optical element is refractive.

19. The optical system according to claim 16, wherein said anamorphic optical element is diffractive.

20. The optical system according to claim 16, wherein the sags Z of inner and outer surfaces of said anamorphic optical element are defined with parameters as follows:

|  | C | K | $A(X^4) - E(X)^{16}$ | $G(X^{18})$ | $H(X^{20})$ |
|---|---|---|---|---|---|
| Inner Surface | 1/150 | 0 | 0 | $0.14e^{-35}$ | $-0.2e^{-39}$ |
| Outer Surface | 1/152 | 0 | 0 | $0.11e^{-39}$ | $0.9e^{-42}$. |

* * * * *